US009980356B2

(12) United States Patent
Markle et al.

(10) Patent No.: US 9,980,356 B2
(45) Date of Patent: May 22, 2018

(54) LIGHTING FIXTURE WITH INTEGRAL CIRCUIT PROTECTION

(71) Applicant: Cree, Inc., Durham, NC (US)

(72) Inventors: Joshua J. Markle, Raleigh, NC (US); Dao Dinh, Raleigh, NC (US); Edward Steinke, Raleigh, NC (US); Charles W. Richards, IV, Cary, NC (US)

(73) Assignee: CREE, INC., Durham, NC (US)

( * ) Notice: Subject to any disclaimer, the term of this patent is extended or adjusted under 35 U.S.C. 154(b) by 429 days.

(21) Appl. No.: 13/734,597

(22) Filed: Jan. 4, 2013

(65) Prior Publication Data
US 2014/0191660 A1 Jul. 10, 2014

(51) Int. Cl.
*H05B 37/03* (2006.01)
*H05B 33/08* (2006.01)

(52) U.S. Cl.
CPC .......... *H05B 37/03* (2013.01); *H05B 33/089* (2013.01); *Y02B 20/341* (2013.01)

(58) Field of Classification Search
CPC ............ H05B 33/0884; H05B 41/2853; H05B 41/2983; H05B 41/2928; H05B 41/2988
USPC ......... 315/86, 291, 294, 295, 297, 299, 307, 315/308, 185 S, 185 R; 327/74, 77, 50; 340/532
See application file for complete search history.

(56) References Cited

U.S. PATENT DOCUMENTS

| | | | | |
|---|---|---|---|---|
| 4,906,055 A | * | 3/1990 | Horiuchi | ......................... 327/77 |
| 5,994,845 A | * | 11/1999 | Gibboney, Jr. | .......... H02H 9/02 315/185 R |
| 6,100,643 A | * | 8/2000 | Nilssen | ................ H05B 41/245 315/209 R |
| 6,406,166 B1 | * | 6/2002 | Ko | ............................ F21S 4/26 315/185 R |
| 6,477,022 B1 | * | 11/2002 | Ennis | ..................... H01H 89/06 335/18 |
| 7,026,768 B1 | * | 4/2006 | Ruiz | .................... H05B 37/029 315/185 R |
| 7,301,287 B1 | * | 11/2007 | Lu | ...................... H05B 33/0803 315/185 R |

(Continued)

OTHER PUBLICATIONS

Notification of Transmittal of the International Search Report and the Written Opinion of the International Searching Authority, or the Declaration, in corresponding PCT Application No. PCT/US14/10131, dated Jan. 3, 2014 (9 pages).

*Primary Examiner* — Alexander H Taningco
*Assistant Examiner* — Renan Luque
(74) *Attorney, Agent, or Firm* — Myers Bigel, P.A.

(57) ABSTRACT a lighting fixture includes a power input configured to be coupled to a power source, a power output configured to be coupled to an external load and a lighting device, such as a light emitting diode (LED) device, coupled to the power input and configured to provide illumination. The lighting fixture further includes a protection circuit coupled between the power input and the power output and configured to detect a condition of a power source coupled to the power input and to control power transmission between the power input and the power output responsive to the detected condition. The power output may be configured to support daisy-chain connection of the lighting fixture to at least one other lighting fixture, and the protection circuit may be configured to control power transmission to the at least one other lighting fixture responsive to the detected condition.

20 Claims, 5 Drawing Sheets

(56) References Cited

U.S. PATENT DOCUMENTS

| | | | |
|---|---|---|---|
| 7,684,165 B2 | 3/2010 | Berberich et al. | |
| 8,059,005 B2 | 11/2011 | Henricks et al. | |
| 2002/0140360 A1* | 10/2002 | Crenshaw | H02J 9/02 |
| | | | 315/149 |
| 2003/0102810 A1* | 6/2003 | Cross | H05B 33/0803 |
| | | | 315/74 |
| 2008/0130283 A1* | 6/2008 | Chang | H05B 33/0803 |
| | | | 362/249.01 |
| 2008/0278952 A1 | 11/2008 | Trott et al. | |
| 2008/0291594 A1* | 11/2008 | Brattel | H05B 33/0884 |
| | | | 361/86 |
| 2011/0193495 A1* | 8/2011 | Mishima | H02M 3/1588 |
| | | | 315/307 |
| 2011/0291575 A1 | 12/2011 | Shiu et al. | |
| 2011/0309747 A1* | 12/2011 | Michaud et al. | 315/86 |
| 2012/0188756 A1* | 7/2012 | Kokoski | F21L 14/023 |
| | | | 362/217.05 |
| 2013/0147385 A1* | 6/2013 | Yang et al. | 315/224 |
| 2013/0181630 A1* | 7/2013 | Taipale et al. | 315/224 |
| 2015/0077243 A1* | 3/2015 | Hooper | H02H 3/16 |
| | | | 340/532 |

* cited by examiner

LIGHTING FIXTURE WITH INTEGRAL CIRCUIT PROTECTION

FIELD

The inventive subject matter relates to lighting apparatus and methods and, more particularly, to solid-state lighting apparatus and methods.

BACKGROUND

Solid-state lighting arrays are used for a number of lighting applications. For example, solid-state lighting panels including arrays of solid-state light emitting devices have been used as general illumination sources in architectural and/or accent lighting. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers.

Solid-state lighting devices are often used in lighting fixtures, such as incandescent bulb replacement applications, task lighting, recessed light fixtures, outdoor lighting, roadway lighting and the like for general illumination purposes. For example, Cree, Inc. produces a variety of light fixtures that use LEDs for illumination. The fixtures include can-type down lights, such as the LR-6 and CR-6, and troffer-type fixtures, such as the CR-24, and outdoor lighting, such as the 227 Series canopy.

FIGS. 1 and 2 illustrate a conventional troffer-type lighting fixture 10 that might be used in commercial applications, such as in office buildings. The fixture 10 includes a housing 12 configured to hold a light source, such as a plurality of LEDs. The light source is driven by an electronics unit, which may be located, for example, in a compartment 14 of the housing 12. The electronics unit may be connected to wiring that enters the compartment 14 via, for example, flexible conduit that attaches to the compartment 14. For example, the compartment 14 may have preformed knock-outs 15a, 15b configured for removal allow attachment of flexible conduit, thus providing ingress and egress for power wiring. Such fixtures may be wired using respective "whips" passing from each fixture to a common junction box and/or by "daisy chain" wiring passing from fixture to fixture. The latter wiring configuration is commonly used in applications in which multiple light fixtures are deployed, such as in hallways or classrooms.

SUMMARY

Some embodiments provide a lighting fixture including a power input configured to be coupled to a power source, a power output configured to be coupled to an external load and a lighting device, such as a light emitting diode (LED) device, coupled to the power input. The lighting fixture further includes a protection circuit coupled between the power input and the power output and configured to detect a condition of a power source coupled to the power input and to control power transmission between the power input and the power output responsive to the detected condition. The power output may be configured to support daisy-chain connection of the lighting fixture to at least one other lighting fixture, and the protection circuit may be configured to control power transmission to the at least one other lighting fixture responsive to the detected condition.

in some embodiments, the lighting device may include a light source and a driver electronics unit configured to drive the light source. The circuit protection device may be configured to control power transmission to the driver electronics unit responsive to the detected condition. In some embodiments, the protection circuit may include a switch coupled to the power input and the power output and a control circuit configured to detect the condition of the power source and to control the switch responsive to the detected condition. The condition may include, for example, a voltage condition and/or a current condition. In some embodiment, the control circuit may be configured to control the switch responsive to an external control input. The control circuit may be configured to support communications with an external electronic device that provides the external control input.

Some embodiments of the inventive subject matter provide a lighting fixture including a housing configured to provide ingress for power input wiring and egress for power output wiring and a lighting device supported by the housing. The housing and the lighting device may be configured to support connection of the power output wiring and the lighting device to the power input wiring via a protection circuit in and/or on the housing, the protection circuit configured to detect a condition of a power source coupled to the power input wiring and to control power transmission between the power input wiring and the power output wiring responsive to the detected condition. The lighting device may include a driver electronics unit and a light source configured to be driven by the driver electronics unit, and the driver electronics unit may be configured to be coupled to the power input wiring and the power output wiring by the protection circuit. The protection circuit may be configured as a module, and the driver electronics unit may be selectively configurable to be directly connected to the power input wiring and the power output wiring in a first configuration and to be connected to the power input wiring and the power output wiring via the protection module in a second configuration.

Still further embodiments provide an apparatus including a protection circuit configured to be connected to a power input, a power output and a lighting device of a lighting fixture and operative to protect the lighting device and at least one device coupled to the power output of the lighting fixture. The protection circuit may include a switch and a control circuit configured to detect a condition on a power conductor and to operate the switch responsive to the detected condition. The switch and the control circuit may be arranged as a module configured to be mounted in and/or on a housing of the lighting fixture such that the control circuit is coupled to the power input of the lighting fixture and the switch is operable to couple and decouple the power input and the power output of the lighting fixture. The control circuit may be configured to control the switch responsive to an external control input. For example, the control circuit may be configured to support communications with an external electronic device that provides the external control input.

In further embodiments, a lighting fixture includes a power input configured to be coupled to a power source, a lighting device coupled to the power input and a resettable protection circuit coupled between the power input and the lighting device and configured to control power transmission between the power input and the lighting device. The fixture may further include a power output configured to be coupled to an external load and the resettable protection circuit may be configured to control power transmission between the power input and the power output. The resettable protection circuit may be configured to detect a voltage condition and/or a current condition and to control power transmission between the power input and the lighting device responsive to the detected voltage condition and/or current condition. The resettable protection circuit may be configured to be reset responsive to a remote input.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
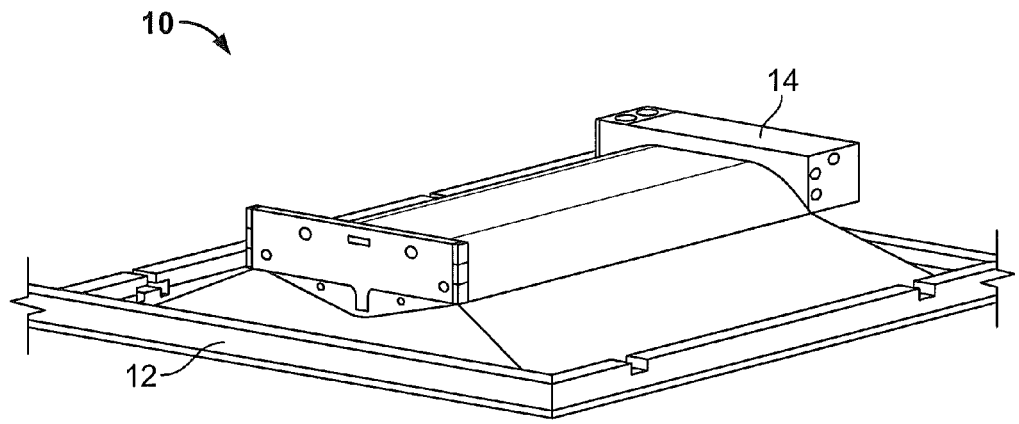
FIGS. 1 and 2 illustrate a conventional troffer lighting fixture.
Figure 2:
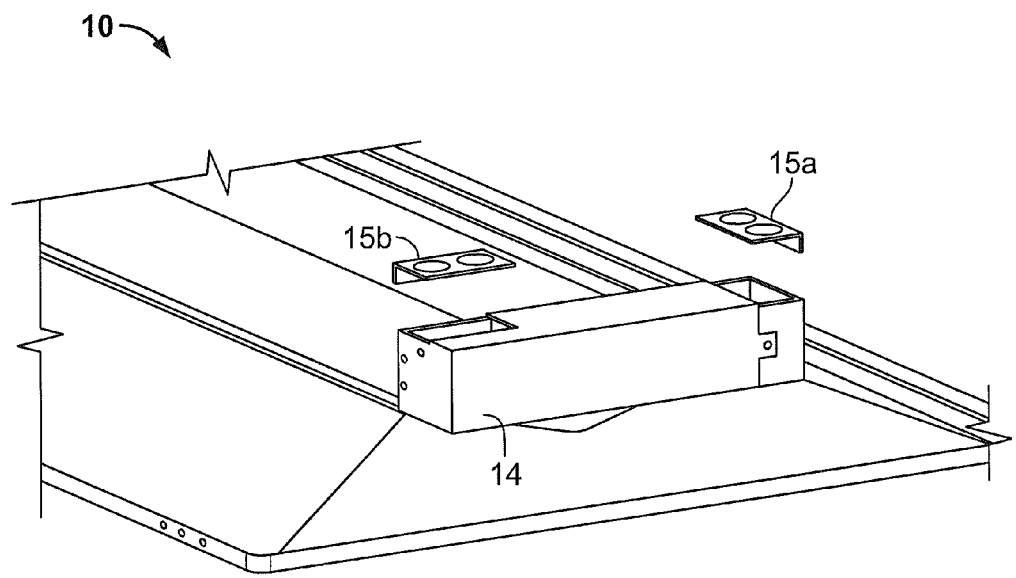

Embodiments of the inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

it will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" "comprising, " "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device. The inventive subject matter may further relate to an illuminated enclosure (the volume of which can be illuminated uniformly or non-uniformly), including an enclosed space and at least one lighting apparatus according to the inventive subject matter, wherein the lighting apparatus illuminates at least a portion of the enclosed space (uniformly or non-uniformly).

Some modern lighting devices, such as LED lighting fixtures, may include electronic components that may be particularly susceptible to power line transients, such as voltage surges. Such transients may repeatedly occur in succession as various components of the power distribution switch, and repetition of power line transients may increase the likelihood and extent of damage to the electronic circuitry in lighting fixtures. In some embodiments of the inventive subject matter, fixtures interconnected in, for example, a daisy chain arrangement, may be protected by using a protection circuit in a fixture from which power is provided to other fixtures. The protection circuit may, for example, prevent power transfer to the connected fixtures in response to detecting a potentially damaging power line condition. The protection circuit may also provide an indication of its status, and may be resettable by manual or other user input.

Figure 3:
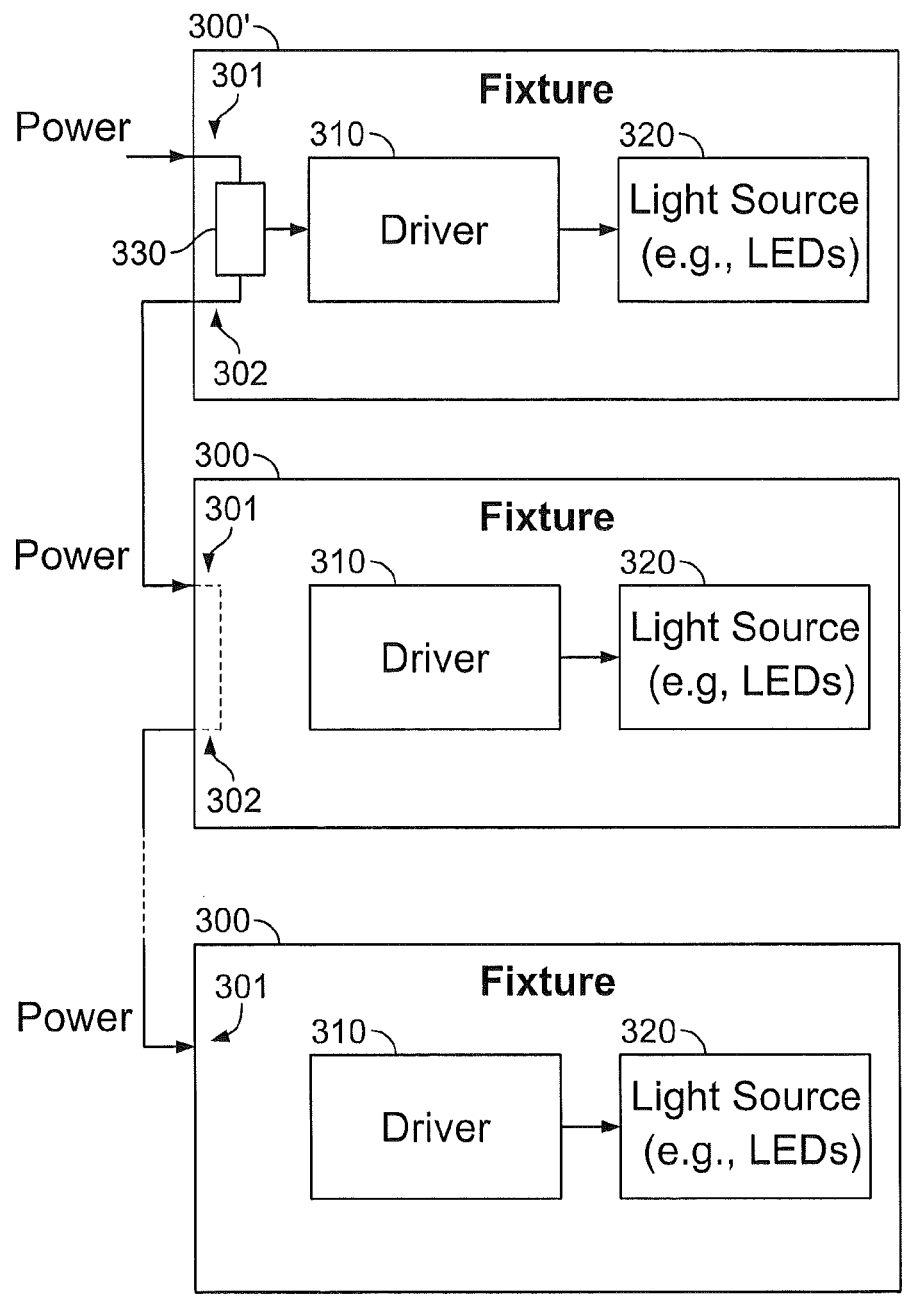
FIG. 3 is a schematic diagram illustrating lighting fixtures according to some embodiments.

FIG. 3 illustrates lighting apparatus according to some embodiments of the inventive subject matter. Lighting fixtures 300, 300' include light sources 320 (e.g., arrays of LEDs) that are driven by driver circuits 310 powered from power inputs 301. A first lighting fixture 300' further includes a protection circuit 330, which is coupled to the power input 301 of the first fixture 300'. The protection circuit 330 may be configured to selectively provide power to the driver circuit 310 of the first fixture 300' and to the other fixtures 300 via a power output 302 of the first fixture 300' in a daisy-chained arrangement in which power is passed from one fixture to the next. It will be appreciated that the number of fixtures so connected may generally be dependent upon the application, the ratings of the fixtures 300 and/or the rating (e.g., wiring and/or circuit breaker) of the branch circuit in which the fixtures 300', 300 are connected.

According to various embodiments of the inventive subject matter, the protection circuit 330 may perform any of a variety of functions to protect the fixtures 300, 300' from damage due to conditions on the input power line. For example, in some embodiments, the protection circuit 330 may, for example, detect a voltage surge or other line condition that may indicate an increased likelihood of damage the driver circuits 310 and/or light sources 320 of the fixtures 300, 300', and may responsively block power transmission to the driver 310 of the first fixture 300' and to the other fixtures 300 to reduce the likelihood of damage. According to some embodiments, the protection circuit 330 may be user-resettable. For example, the protection circuit 330 may be manually resettable and/or may be resettable using a radio, optical, power line carrier or other signal. In further embodiments, the protection circuit 330 may automatically resettable based on a detected criterion, such as an elapsed time since a last occurrence of a potentially damaging line condition.

Figure 4:
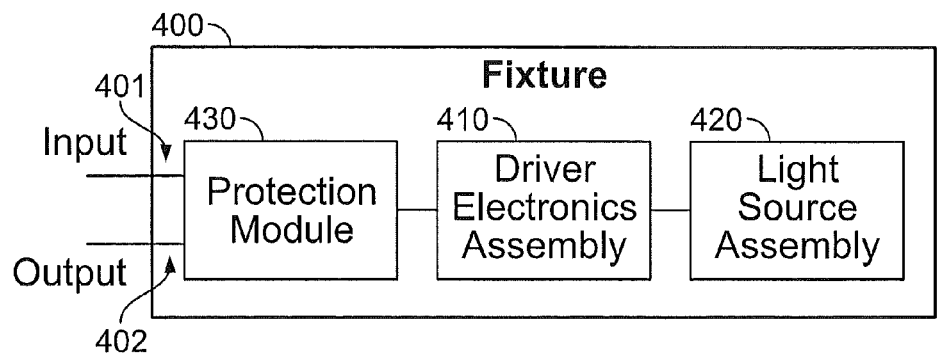
FIG. 4 is a schematic diagram illustrating a lighting fixture according to further embodiments.

According to some embodiments of the inventive subject matter, a protection circuit along the lines described above may be implemented in the form of a module that is configured for selective installation in a standardized lighting fixture. For example, as illustrated in FIG. 4, a fixture 400 may be configured to include components, such as a driver electronics assembly 410 and a light source assembly 420 that is configured to be coupled to the driver electronics assembly 410. The fixture 400 may be configured to directly connect the driver electronics assembly 410 directly to a power input 401 and, for daisy-chaining purposes, to a power output 402. For example, the driver electronics assembly 410 may be configured to be connected to power input and output wiring at power input 401 and power output wiring at a power output 402 using, for example, wire nuts, crimp connectors, terminals or other electrical connection techniques. The fixture 400 may also be configured to receive a protection module 430, which may be used to couple the input 401 to the driver electronics assembly 410 and to the output 402 for protection of the fixture 400 and other downstream fixtures.

Figure 5:
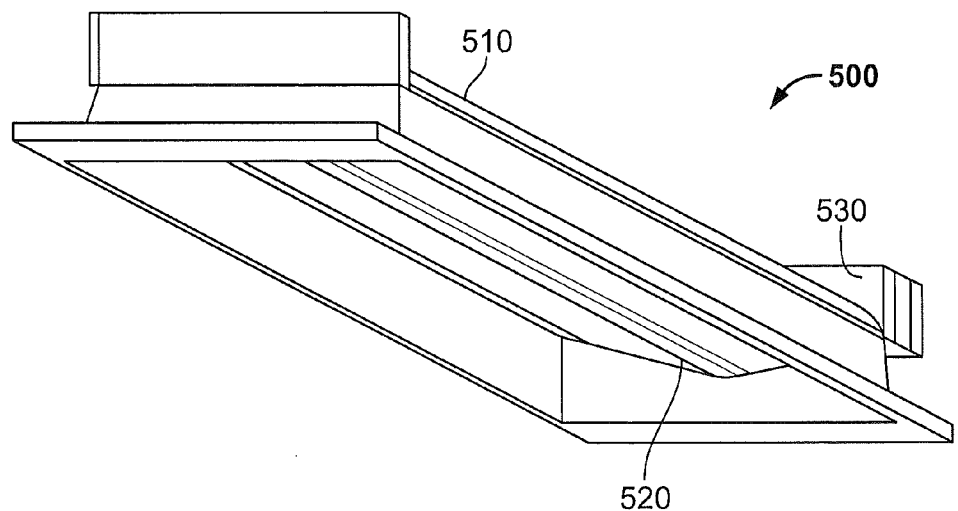
FIGS. 5-7 are perspective views illustrating lighting fixtures with various protection circuit packaging according to some embodiments.
Figure 6:
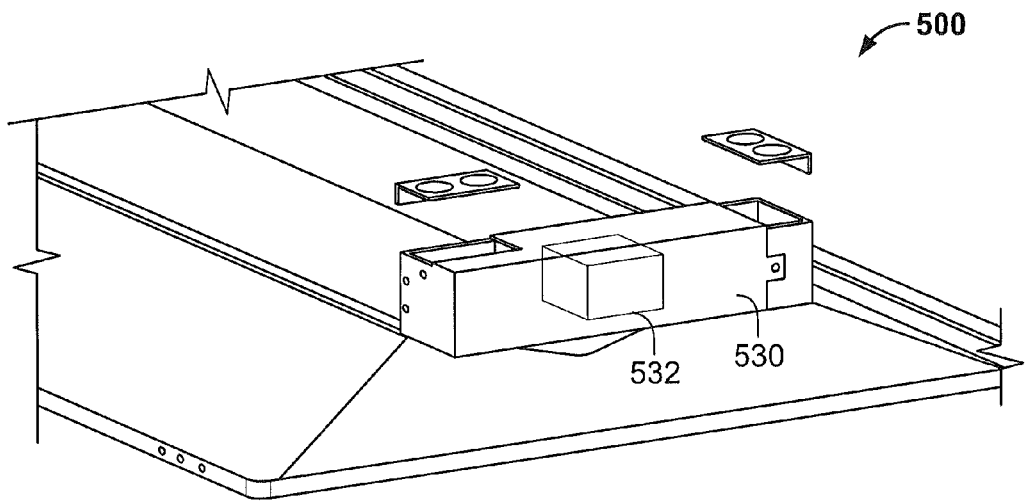
Figure 7:
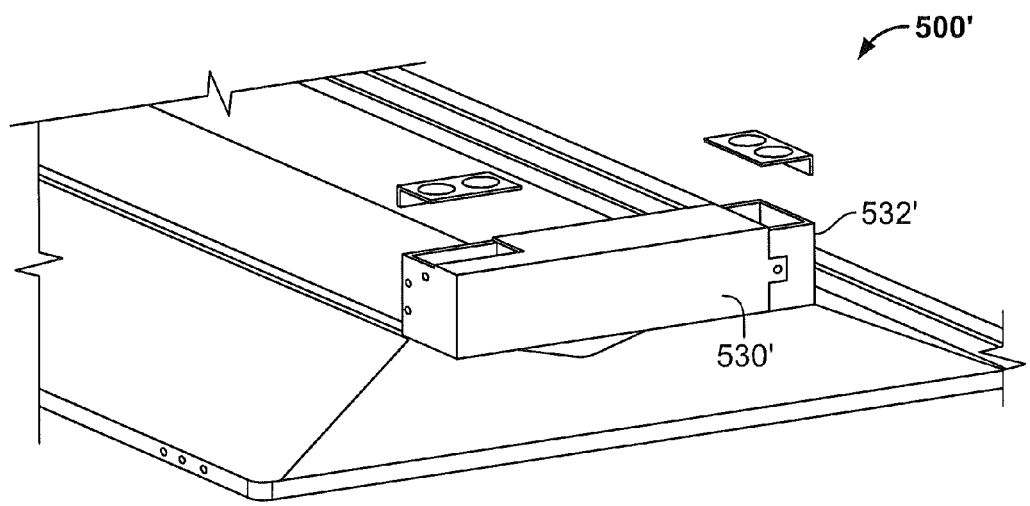

FIGS. 5-7 illustrate examples of implementation of such a protection modules in a troffer-type light fixture. Referring to FIG. 5, a troffer fixture 500 includes a housing 510 that supports and array 520 of LEDs that are driven by an electronics unit housed in a compartment 530, which also provides ingress and egress for power input and output wiring. As shown in FIG. 6, a protection module 532 may be installed in the compartment 530, and connected to a driver electronics unit and to power input and output wiring therein. As shown in FIG. 7, a protection module 532' may take the form of a module configured to be externally affixed to the compartment 530 and electrically connected to electronic circuitry therein using, for example, external mating connectors or wiring passing through mated openings in the compartment 530 and the protection module 532'.

Figure 8:
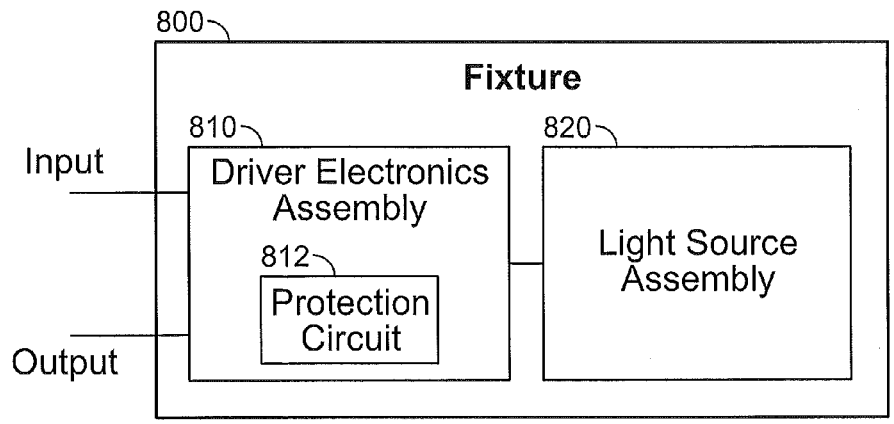
FIG. 8 is a schematic diagram of a lighting fixture illustrating a protection circuit arrangement for a lighting fixture according to some embodiments.
Figure 9:
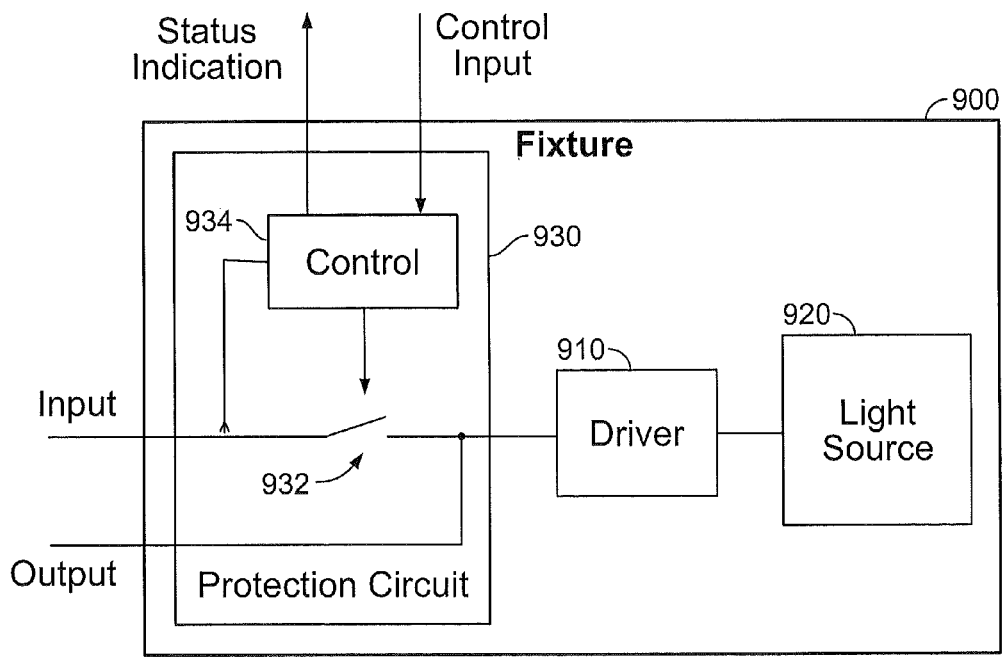
FIG. 9 illustrates an exemplary protection circuit implementation in a lighting fixture according to some embodiments.

It will be appreciated that the configurations illustrated in FIGS. 5-7 are provided for purposes of illustrations, and that embodiments of the inventive subject matter make take various other forms. For example, as shown in FIG. 8, a fixture 800 may include a specially-configured driver electronics assembly 810 that drives a light source assembly 820 and that includes an integral protection circuit 812 for protection of the driver electronics assembly 810 and downstream devices coupled to the fixture 800. Such a fixture may be, for example, a special-purpose protective fixture that is designed to be used with other standard fixtures that do not include such protection circuitry and that are wired to the protective fixture in a daisy-chained manner. Alternatively, such a protective fixture may be fabricated from a standard fixture by replacing a standard driver electronics assembly with the special-purpose driver electronics assembly 810. It will be further appreciated that embodiments of the inventive subject matter may be used with a variety of different types of lighting fixtures. For example, recessed can-type down lights and other types of architectural lights may be configured to include protection circuitry in ways similar to those described above with reference to troffer-type fixtures.

a protection circuit or module according to some embodiments may include a switch, circuit breaker or other circuit interruption device. For example, referring to FIG. 9, a fixture 900 may include a driver circuit 910 configured to drive a light source 920 (e.g., an LED array). The driver circuit 910 may receive power from a protect circuit 930 including a switch 932 and a control circuit 934 configured to control the switch 932. The control circuit 934 may be configured to sense, for example, an input line voltage, current or other line-related parameter. The control circuit 934 may open the switch 932 if the sensed parameter indicates a condition warranting protection of the driver circuit 910 and other fixtures connected downstream to the fixture 900. The control circuit 934 may be further configured to be reset to reclose the switch 932 responsive to a control input, such as a manual user input or a control signal provided from a user device, such as a radio signal, an optical signal or a power line carrier signal received via the input power line.

the control circuit 934 may also be configured to automatically reset the switch 932. For example, the control circuit 934 may open the switch 932 responsive to detection of a certain line event, such as a voltage surge, and then may reset the switch 932 to the closed state upon passage of a certain time interval without reoccurrence of the line event. The control circuit 934 may also be configured to lock out the switch 932 to the open position upon occurrence, for example, of a certain number of line events occurring in a predetermined time interval, such that reclosure of the switch 932 requires manual or other user input.

the control circuit 934 may also provide an external indication of the status of the switch 932. For example, the control circuit 934 may provide a visual indication of the status of the switch 932 in the form, for example, of a flag or light displayed at the fixture 900. Such an indication may be removed or extinguished by, for example, a manual rest of the switch 932. The control circuit 932 may also generate a radio or other signal that indicates status of the switch 932.

It will be understood that the control circuit 934 and the switch 932 may be powered by the input power source and/or may operation on backup power provided by a battery or other energy storage device. Generally, the control circuit 934 and the switch 932 may include analog circuitry, digital circuitry or a combination of analog and digital circuitry. For example, the switch 932 may comprise an electromechanical switch (e.g., relay) and/or a semiconductor switch, along with circuitry for driving such a switch.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. A lighting fixture comprising:
   a power input configured to be coupled to an active power source located external to the lighting fixture;
   a power output configured to be coupled to at least a second lighting fixture located external to the lighting fixture;
   a lighting device coupled to the power input; and
   a protection circuit coupled between the power input and the power output and configured to detect a condition of the active power source coupled to the power input and to interrupt power transmission of the active power source from the power output to the at least the second lighting fixture responsive to the detected condition,
   wherein the power output is configured to support daisy-chain connection of the lighting fixture to the at least the second lighting fixture,
   wherein the protection circuit and the lighting device of the lighting fixture are contained within a common housing,
   wherein the common housing is a troffer housing, and wherein the lighting fixture and the at least the second lighting fixture are configured to be individually mounted.

2. The lighting fixture of claim 1, wherein the lighting device is coupled to the power input by the protection circuit and wherein the protection circuit is configured to control power transmission to the lighting device.

3. The lighting fixture of claim 1, wherein the lighting device comprises a light source and a driver electronics unit configured to drive the light source, and wherein the protection circuit is configured to control power transmission to the driver electronics unit responsive to the detected condition.

4. The lighting fixture of claim 3, wherein the protection circuit comprises a switch coupled to the power input and the power output and a control circuit configured to detect the condition of the active power source and to control the switch responsive to the detected condition.

5. The lighting fixture of claim 3, wherein the driver electronics unit comprises a first driver electronics unit, and
   wherein the power output is configured to transmit power to a second driver electronics unit in the at least the second lighting fixture.

6. The lighting fixture of claim 1, wherein the protection circuit comprises a switch coupled to the power input and the power output and a control circuit configured to detect the condition of the active power source and to control the switch responsive to the detected condition.

7. The lighting fixture of claim 6, wherein the condition of the active power source comprises a voltage condition and/or a current condition.

8. The lighting fixture of claim 6, wherein the control circuit is configured to reset the switch responsive to an external control input after the switch has detected the condition of the active power source and interrupted power transmission of the active power source from the power output to the at least the second lighting fixture.

9. The lighting fixture of claim 8, wherein the, control circuit is configured to support communications with an external electronic device that provides the external control input.

10. The lighting fixture of claim 1, wherein the protection circuit is configured to interrupt power transmission of the active power source to protect the at least the second lighting fixture, and
    wherein the at least the second lighting fixture does not include a separate protection circuit.

11. The lighting fixture of claim 1, wherein the common housing the is troffer housing configured to provide ingress for power input wiring and egress for power output wiring, wherein the lighting device is supported by the troffer housing and wherein the protection circuit comprises a module configured to be installed in the troffer housing.

12. The lighting fixture of claim 1,
    wherein the common housing is configured to provide ingress for power input wiring and egress for power output wiring,
    wherein the lighting device and the protection circuit are supported by the common housing, and
    wherein the common housing and the lighting device are configured to support connection of the power output wiring and the lighting device to the power input wiring via the protection circuit.

13. The lighting fixture of claim 12, wherein the lighting device comprises a driver electronics unit and a light source configured to be driven by the driver electronics unit, and wherein the driver electronics unit is configured to be coupled to the power input wiring and the power output wiring by the protection circuit.

14. The lighting fixture of claim 13, wherein the protection circuit is configured as a module, and wherein the driver electronics unit is selectively configurable to be directly connected to the power input wiring and the power output wiring in a first configuration and to be connected to the power input wiring and the power output wiring via the protection module in a second configuration.

15. The lighting fixture of claim 12, wherein the protection circuit is configured as a module and wherein the common housing and the lighting device are selectively configurable to support direct connection of the lighting device to the power input wiring and the power output wiring in a first configuration and to support connection of the lighting device to the power input wiring, and the power output wiring via the protection module in a second configuration.

16. The lighting fixture of claim 15, wherein the protection circuit comprises a switch coupled to the power input and the power output and a control circuit configured to detect the condition of the active power source and to control the switch responsive to the detected condition.

17. The lighting fixture of claim 1, wherein the power output is configured to support daisy-chain connection of the lighting fixture to two or more second lighting fixtures.

18. The lighting Fixture of claim 1, wherein the protection circuit is further configured to interrupt power transmission of the active power source from the power input to the lighting device responsive to the detected condition.

19. The lighting fixture of claim 1, wherein a power signal of the active power source that is received at the power input is provided to the at least the second lighting fixture via the power output.

20. A lighting fixture comprising:
a power input configured to be coupled to an active power source located external to the lighting fixture;
a power output configured to be coupled to at least a second lighting fixture located external to the lighting fixture and configured to transmit a power signal of the active power source received at the power input to the at least the second lighting fixture;
a lighting device coupled to the power input; and
a protection circuit coupled between the power input and the power output and configured to detect a condition of the active power source coupled to the power input and to interrupt power transmission of the active power source from the power output to the at least the second lighting fixture responsive to the detected condition,
wherein the power output is configured to support daisy-chain connection of the lighting fixture to the at least the second lighting fixture,
wherein the protection circuit is configured to interrupt power transmission of the active power source to the at least the second lighting fixture,
wherein the at least the second lighting fixture does not include a separate protection circuit,
wherein the second lighting fixture is configured to receive the power signal of the active power source, and
wherein the protection circuit and the lighting device of the lighting fixture are contained within a troffer housing.

* * * * *